US012357073B2

(12) United States Patent
Donohue et al.

(10) Patent No.: US 12,357,073 B2
(45) Date of Patent: Jul. 15, 2025

(54) POD ASSEMBLY FOR AUTOMATED SKIN SPRAY DELIVERY

(71) Applicant: GloryMakeup Inc., Taipei (TW)

(72) Inventors: Daniel Ariel Donohue, Miami, FL (US); Ming-Hui Chien, Taipei (TW)

(73) Assignee: GloryMakeup Inc., Taipei (TW)

( * ) Notice: Subject to any disclaimer, the term of this patent is extended or adjusted under 35 U.S.C. 154(b) by 32 days.

(21) Appl. No.: 18/395,519

(22) Filed: Dec. 23, 2023

(65) Prior Publication Data

US 2025/0204670 A1 Jun. 26, 2025

Related U.S. Application Data

(63) Continuation-in-part of application No. 17/581,149, filed on Jan. 21, 2022, now Pat. No. 12,208,406.

(51) Int. Cl.
*A45D 34/00* (2006.01)
*F21V 33/00* (2006.01)

(52) U.S. Cl.
CPC .......... *A45D 34/00* (2013.01); *F21V 33/0004* (2013.01); *A45D 2034/005* (2013.01); *A45D 2200/053* (2013.01); *A45D 2200/057* (2013.01); *A45D 2200/25* (2013.01)

(58) Field of Classification Search
CPC .............. A45D 34/00; A45D 2034/005; A45D 2200/053; A45D 2200/057; B05B 12/1418
USPC ........................................... 206/581; 239/373
See application file for complete search history.

(56) References Cited

U.S. PATENT DOCUMENTS

| | | | | |
|---|---|---|---|---|
| 10,744,525 | B1 | 8/2020 | Logan | |
| 12,208,406 | B2 * | 1/2025 | Chien | B05B 7/2491 |
| 2020/0121055 | A1 * | 4/2020 | Le Grand | B01F 23/711 |
| 2022/0053910 | A1 * | 2/2022 | Da Palma | B01F 35/7131 |
| 2022/0266282 | A1 | 8/2022 | Chien | |
| 2023/0043069 | A1 * | 2/2023 | Dupont | A45D 40/04 |

FOREIGN PATENT DOCUMENTS

| | | | |
|---|---|---|---|
| DE | 619625 | C | 10/1935 |
| DE | 202014102561 | U1 | 7/2014 |
| WO | 2010147657 | A2 | 12/2010 |

OTHER PUBLICATIONS

The International Search Report, PCT/CN2024/073656 mailed on Sep. 25, 2024.

* cited by examiner

*Primary Examiner* — Jacob K Ackun
(74) *Attorney, Agent, or Firm* — Tong J. Lee

(57) ABSTRACT

A pod includes a container piece to store a skin spray product. The container piece has a curved bottom and a bottom peg that protrudes downwards to attach the pod to a disk. A cover piece securely covers the container piece when the pod is closed. The cover piece includes an air inlet peg that protrudes sideways to attach the pod to the disk. The air inlet peg has a valveless center opening to receive compressed air. The cover piece further includes a nozzle at a front end of the cover piece, an air passage that extends from the air inlet peg to the nozzle, and a suction needle connecting the air passage to the container piece. When placed horizontally in a circle on the disk, multiple copies of the pod alternately receive the compressed air from respective air inlet pegs and spray respective skin spray products from respective nozzles.

20 Claims, 12 Drawing Sheets

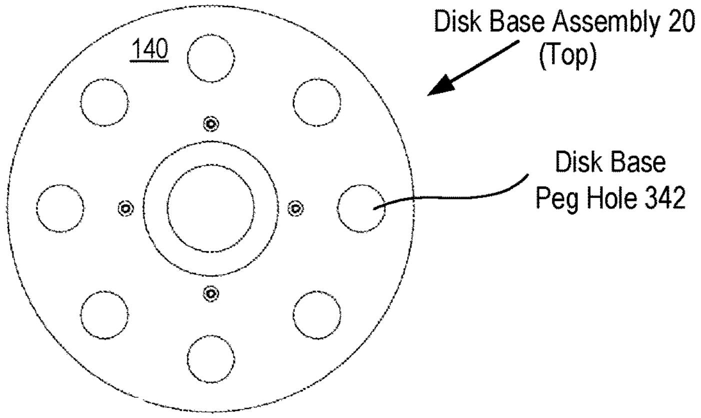
FIG. 8A
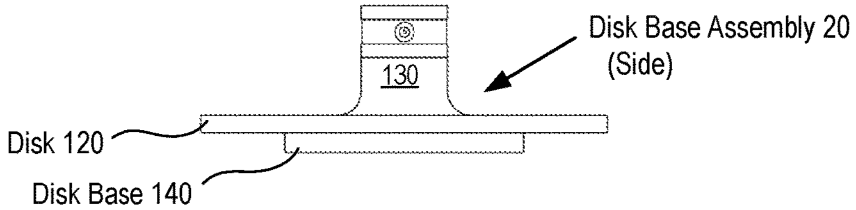
FIG. 8B
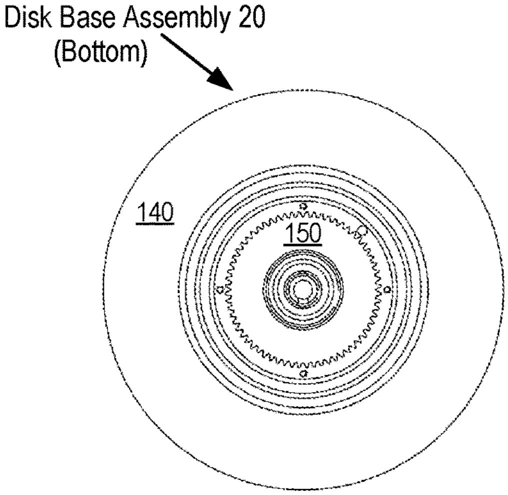
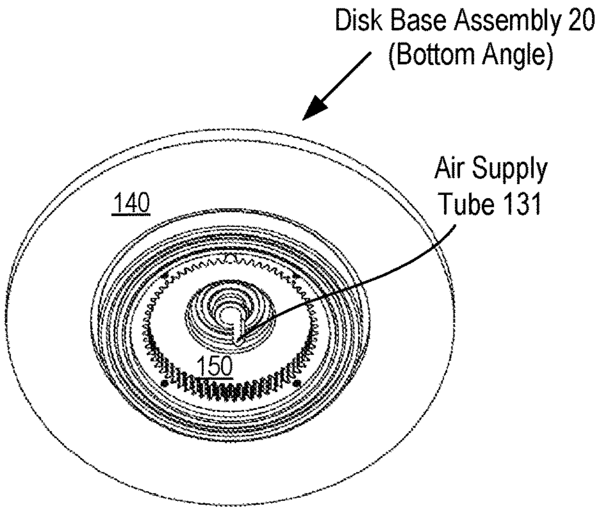
FIG. 8C
FIG. 8D

POD ASSEMBLY FOR AUTOMATED SKIN SPRAY DELIVERY

TECHNICAL FIELD

Embodiments of the invention relate to an apparatus that includes multiple color pods on a rotatable disk for automatically spraying cosmetics on a user's skin.

BACKGROUND OF THE INVENTION

Automatic makeup machines benefit users in many ways. Automatic makeup machines can be easier and time-saving for individuals who are not skilled in applying cosmetics. The machines apply cosmetics with precision and consistency, which can be challenging to achieve manually. The machines also remove a barrier for physically-impaired individuals, making makeup application more accessible to everyone.

One component of an automatic makeup machine is a spray device. Due to the high viscosity of most cosmetic liquids, the spray device's nozzle requires regular maintenance, including cleaning and replacing components. Failure to maintain the spray device properly can affect the performance and longevity of the makeup machine.

Therefore, there is a need for improving the existing spray device, including the components used by the spray device for delivering skin sprays to users.

SUMMARY OF THE INVENTION

In one embodiment, a pod is provided for spraying a skin spray product on a user's skin. The pod includes a container piece which further includes a container to store the skin spray product. The container piece has a curved bottom and a bottom peg that protrudes downwards from the curved bottom to attach the pod to a disk. The pod also includes a cover piece that securely covers the container piece when the pod is in a closed state. The cover piece further includes an air inlet peg that protrudes sideways from a rear end of the cover piece to attach the pod to the disk. The air inlet peg has a valveless center opening to receive compressed air. The cover piece further includes a nozzle at a front end of the cover piece, an air passage that extends from the air inlet peg to the nozzle in a horizontal path, and a suction needle having a hollow center connecting the air passage to the container when the pod is in the closed state. A predetermined number of copies of the pod, when placed horizontally in a circle on the disk, alternately receive the compressed air from respective air inlet pegs and spray respective skin spray products from respective nozzles.

In another embodiment, a pod assembly is provided for spraying skin spray products on a user's skin. The pod assembly includes multiple aforementioned pods and a disk. The disk has a circular outer perimeter. The disk includes a hollow center shaft within a circular center wall, multiple alignment slots that are horizontally arranged around the circular center wall, and side fins between adjacent ones of the alignment slots. Each pod is placed in a corresponding alignment slot with the air inlet peg of the pod plugged into a corresponding top peg hole in the circular center wall of the disk. The bottom peg of the pod is plugged into a corresponding bottom peg hole of the disk. The pods on the disk alternately receive the compressed air from respective air inlet pegs and spray respective skin spray products from respective nozzles.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 8A, FIG. 8B, FIG. 8C, and 8D illustrate a top view, a front view, a bottom view, and a bottom angled view of a disk base assembly, respectively, according to one embodiment.

DETAILED DESCRIPTION OF THE INVENTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The present invention provides a skin spraying set (also referred to as "pod assembly") that fits into a person's hand. The pod assembly includes multiple pods containing liquids that can be sprayed on a user's face. The pods can be securely attached to a circular disk carrier (also referred to as "disk") and then inserted into a device that reads the liquid information from each pod. The device then sprays the pod contents by pressurized air, which atomizes the liquid to particles that finely cover the user's face, removing the need for the user to use hands or a brush to spread out the liquids over the face. The pods may be discarded after use, guaranteeing that the user has a fresh new nozzle spray every time the liquid is used. The user may hold the disk in one hand and load the disk with the pods using the other hand. The disk has several alignment features, which make each pod not only fit tightly on the disk but also easy to load and unload. One or more pods may be loaded on a disk.

In some embodiments, the pods may also be referred to as color pods, as different pods may contain liquids of different colors. These liquids may be makeup, cosmetics, or a combination of them. It is noted that the liquid contents of the pods are not limited to cosmetic or makeup applications; e.g., the pods may contain liquids and/or other types of sprayable products for skincare, medicinal, or other purposes.

Figure 1:
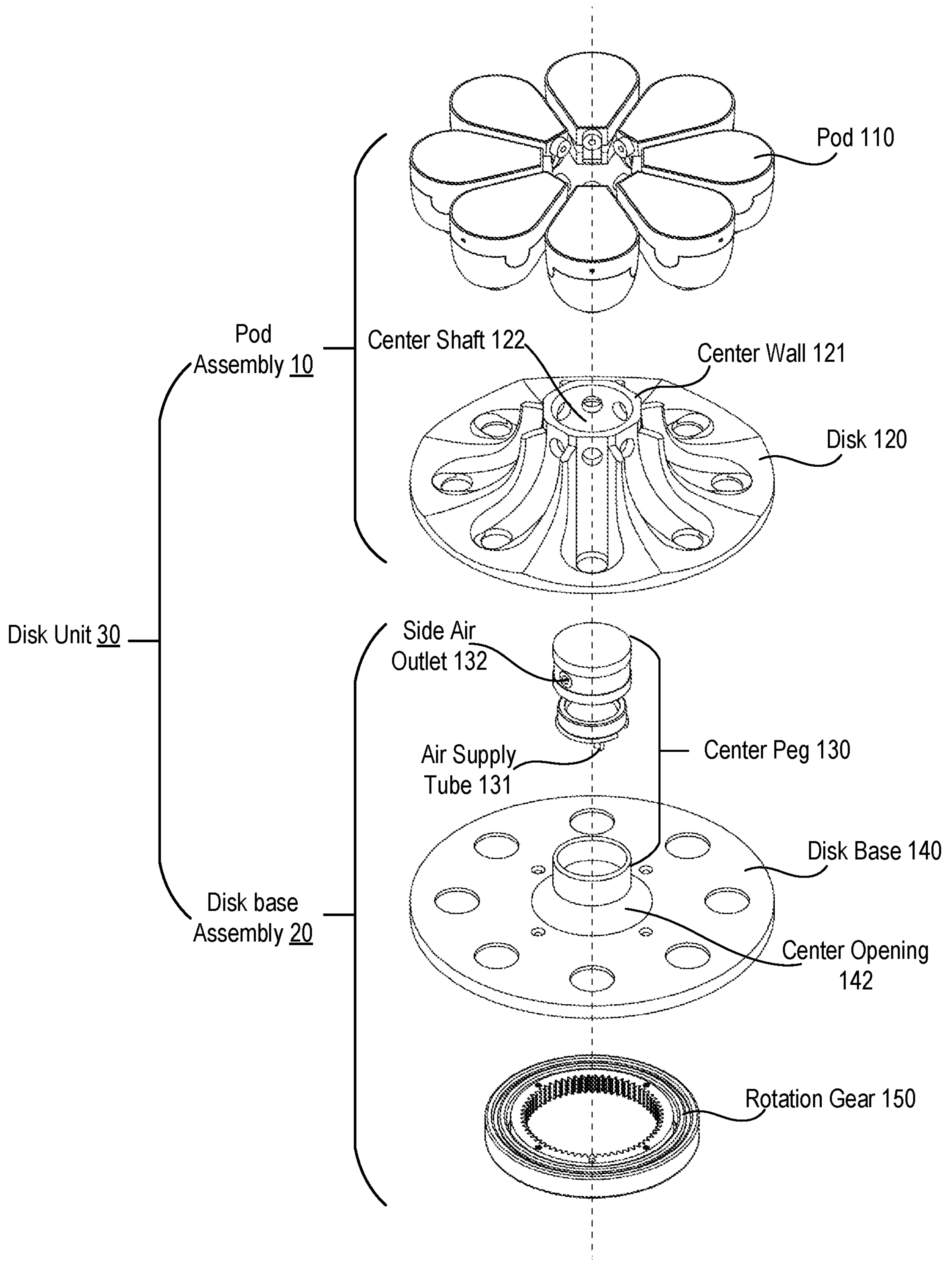
FIG. 1 illustrates an exploded view of a disk unit according to one embodiment.

FIG. 1 is an exploded view of a disk unit 30 including a pod assembly 10 and a disk base assembly 20 according to one embodiment. The pod assembly 10 includes multiple cartridges (also referred to as "pods" 110) on a disk carrier (also referred to as "disk" 120). The pods 110 are arranged in a circle around a center wall 121 of the disk 120. The disk 120 has a circular outer perimeter and the center wall 121 is also circular. Within the center wall 121 is a center shaft 122 having a hollow center for delivering compressed air to the pods 110. It is understood that in alternative embodiments, the number of pods 110 on the disk 120 may be different from what is shown in FIG. 1. The pods 110 and the disk 120 are compact in size such that a user can grasp a pod 110 with two fingers of one hand and hold the disk 120 in the other hand when loading and unloading the pod 110. A non-limiting example of the pod dimension is approximately 3 cm (length)×2 cm (width)×2 cm (height), and a non-limiting example of the disk dimension is approximately 8 cm (diameter).

The disk base assembly 20 includes a center peg 130, a disk base 140, and a rotation gear 150. The disk base 140 has a circular shape with a center opening 142 to receive the center peg 130. The center peg 130 has a cylindrical shape with an air supply tube 131 for receiving compressed air and a side air outlet 132 for delivering the compressed air. When the disk unit 30 is in use, the pod assembly 10 is placed on the disk base assembly 20. More specifically, the pods 110 are placed on top of the disk 120, and the disk 120 is placed on top of the disk base 140. The center opening 142 of the disk base 140 is aligned with the center peg 130 and the center shaft 122 of the disk 120. The rotation gear 150 is attached to the bottom surface of the disk base 140 and is driven by a motor to rotate the disk base 140 and the pod assembly 10.

Figure 2A:
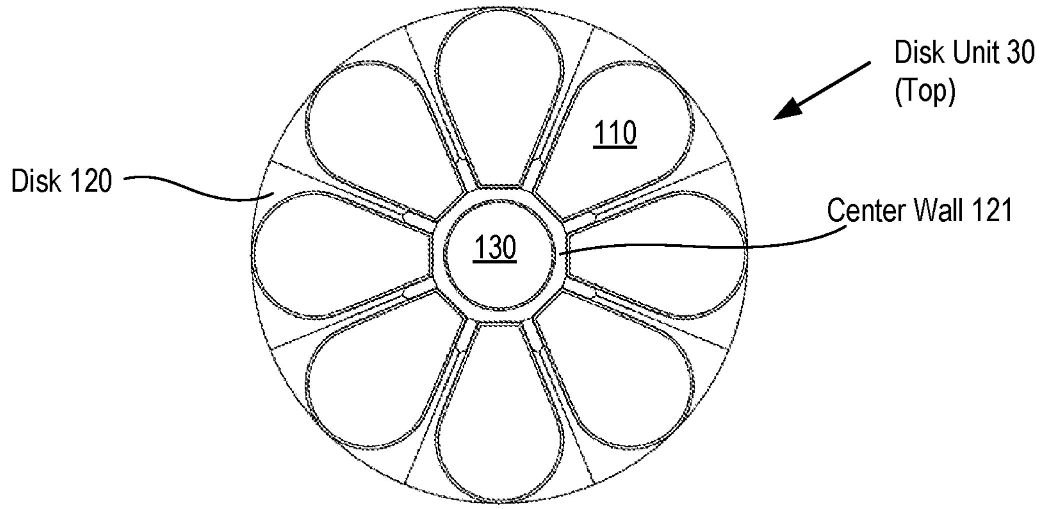
FIG. 2A, FIG. 2B, and FIG. 2C illustrate a top view, a front view, and a bottom view of a disk unit according to one embodiment.
Figure 2B:
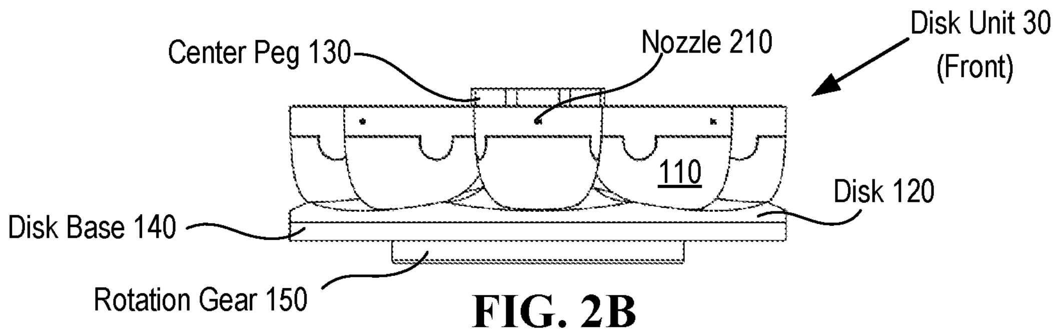
Figure 2C:
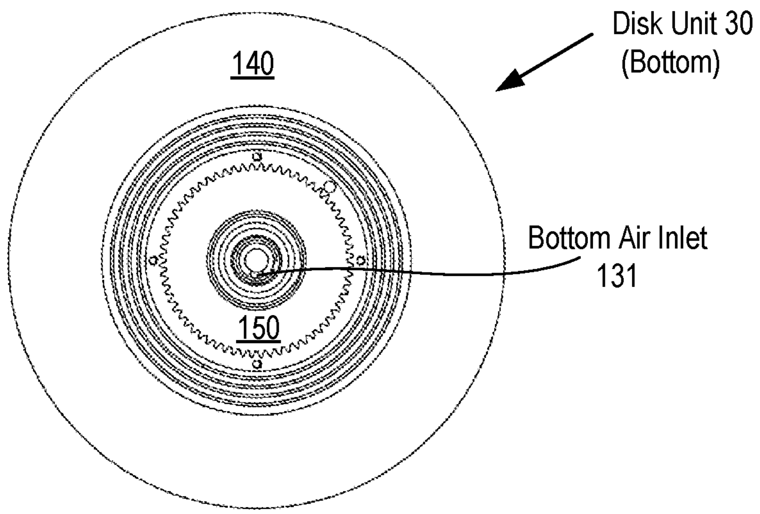

FIG. 2A, FIG. 2B, and FIG. 2C illustrate a top view, a front view, and a bottom view of the disk unit 30 according to one embodiment. The top view in FIG. 2A shows eight pods 110 placed on the disk 120 and horizontally arranged in a circle around the center wall 121 and the center peg 130. Each pod 110 has a curved outer edge as viewed from the top. This outer edge is also referred to as the front edge, as it is facing the spray target when the pod 110 is selected for spraying. Thus, the shape of each pod 110 resembles a flow pedal, and, therefore, the pod assembly 10 is also referred to as a flower disk. It is understood that the number eight is a non-limiting example.

The front view in FIG. 2B further shows the disk base 140 and the rotation gear 150 at the bottom. Moreover, each pod 110 includes a nozzle 210 at the peak of the curved front edge for spraying a skin spray product. The bottom view in FIG. 2C shows the bottom of the disk base 140, the rotation gear 150, and the air supply tube 131 of the center peg 130.

Figure 3:
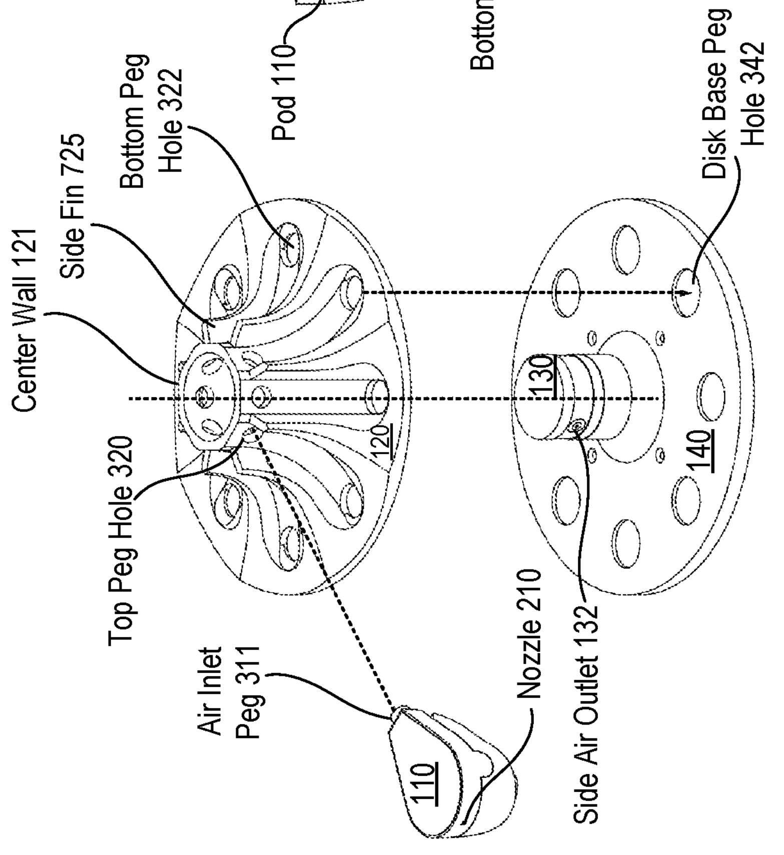
FIG. 3 is a top angle view showing the alignment of disk unit parts according to one embodiment.
Figure 4:
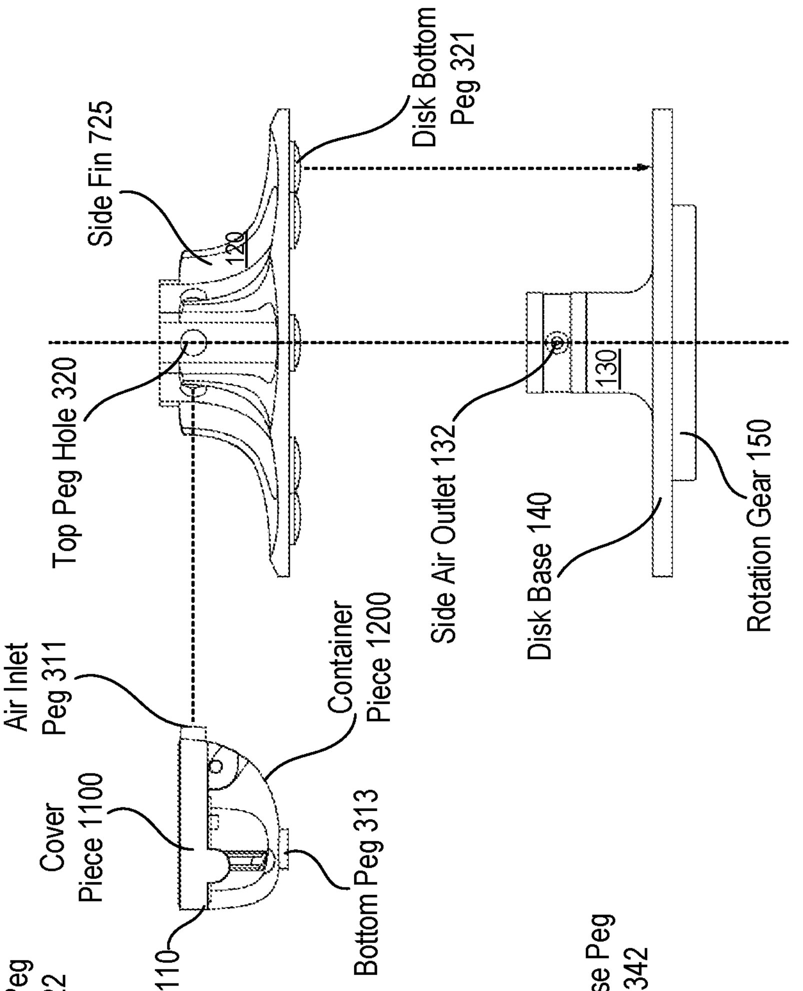
FIG. 4 is a side view of FIG. 3 according to one embodiment.

FIG. 3 is a top angle view (a.k.a. isometric view) showing the alignment of disk unit parts according to one embodiment. FIG. 4 is a side view of FIG. 3. Only one pod 110 is shown for simplicity of illustration. Each pod 110 is formed by a cover piece 1100 and a container piece 1200. The cover piece 1100 securely covers the container piece 1200 when the pod 110 is in a closed state. The cover piece 1100 has an air inlet peg 311 that protrudes sideways from the rear end of the cover piece 1100 to attach the pod 110 to the disk 120. The air inlet peg 311 is aligned with a top peg hole 320 of the disk 120 for receiving compressed air and maintaining stability on the disk 120, keeping the pod 110 in place during spraying operations. The container piece 1200 has a curved bottom and a bottom peg 313 that protrudes downwards from the curved bottom to attach the pod 110 to the disk 120. The bottom peg 313 is aligned with a bottom peg hole 322 of the disk 120 for keeping the pod 110 in place during spraying operations. A predetermined number of copies of the pod 110 can be arranged horizontally in a circle for placement on the disk 120 with the rear end facing the center of the circle and the front end (i.e., where the nozzle 210 is located) facing away from the center. The predetermined number is the number of slots on the disk 120 for receiving the pods 110. In this non-limiting example, the predetermined number is eight. The pods 110 rotate horizontally around the center of the circle when the disk 120 rotates. As each pod 110 has its own nozzle 210, a spraying sequence of multiple colors can be completed with a sequence of disk rotations and without intervening cleaning steps. A conventional spray device that has a shared nozzle for multiple colored liquid containers would have to undergo a nozzle cleaning step between the spraying of different colors.

In the embodiment of FIG. 3 and FIG. 4, the disk 120 includes eight pairs of top peg hole 320 and bottom peg hole 322, and each pair is part of an alignment slot that holds a pod 110 in place. Between any two adjacent alignment slots is a side fin 725. All alignment slots in a fully-assembled pod assembly 10 are occupied by the pods 110.

The center peg 130 is mounted in the center opening 142 of the disk base 140, and the disk 120 is placed on top of the disk base 140. On the bottom surface of the disk 120 are multiple disk bottom pegs 321. Each disk bottom peg 321 is formed underneath a corresponding bottom peg hole 322 of the disk 120. The disk bottom pegs 321 are aligned with the corresponding disk base peg holes 342 on the disk base 140. The pegs (311, 313, and/or 321) and peg holes (320, 322, and/or 342) are provided to hold the disk unit parts in place. In one embodiment, the peg holes and the corresponding pegs have circular shapes. In alternative embodiments (e.g., embodiments shown in FIG. 15), the shapes of the peg holes and the corresponding pegs may be different from circular.

When one of the pods 110 on a disk 120 is selected for spraying, the disk base 140 is driven by a motor to rotate the disk 120 and the pods 110 thereon such that the nozzle 210 of the selected pod 110 faces the spray target. The side air outlet 132 of the center peg 130 is aligned with the air inlet peg 311 of the selected pod 110 to deliver compressed air through the top peg hole 320 of the disk 120.

Figure 5:
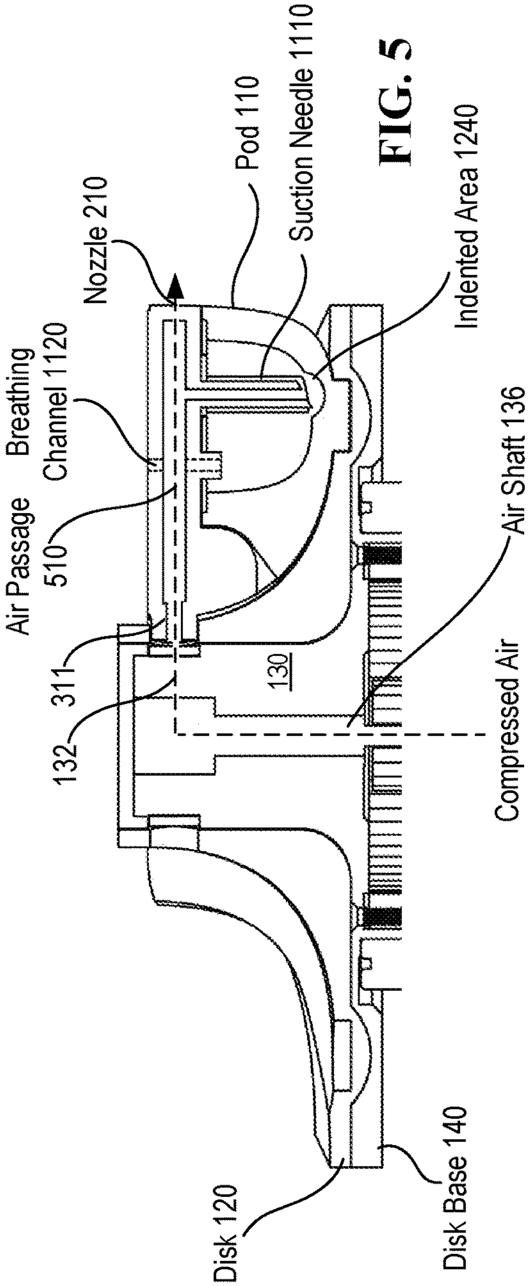
FIG. 5 illustrates the direction of airflow in a cross-section view of the disk unit according to one embodiment.
Figure 6:
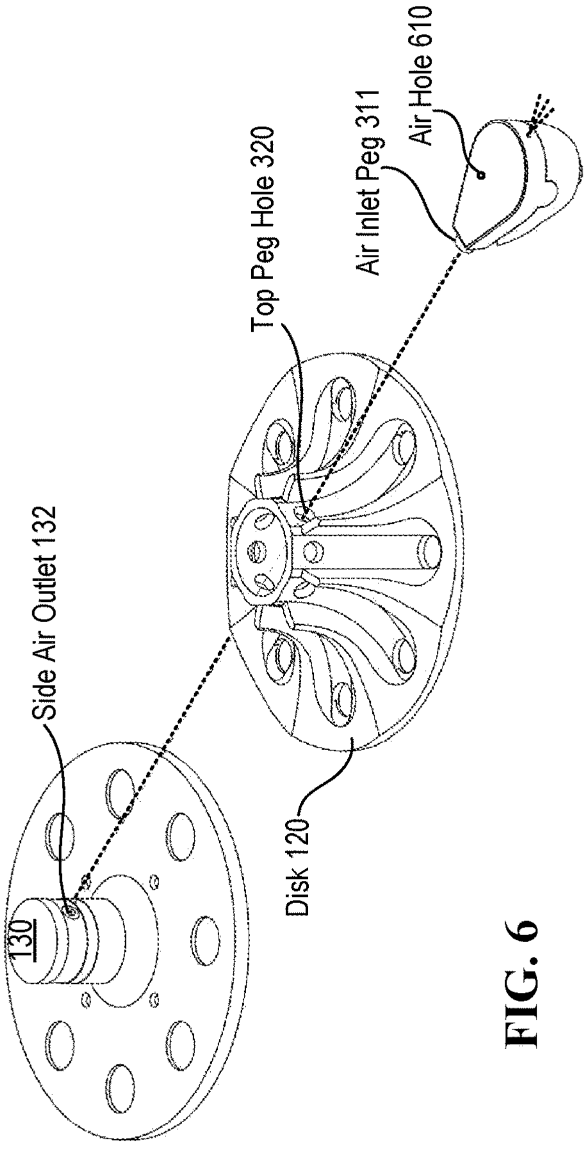
FIG. 6 illustrates the alignment of different parts of a disk unit for air delivery according to one embodiment.

FIG. 5 illustrates the direction of airflow in a cross-section view of the disk unit 30 according to one embodiment. FIG. 6 illustrates the alignment of different parts of the disk unit 30 for air delivery according to one embodiment. The compressed air flows vertically upwards through an air shaft 136 of the center peg 130. Once the compressed air comes up the air shaft 136, the compressed air exits the center peg 130 from the side air outlet 132 and flows through a center opening in the pod's air inlet peg 311 to enter an air passage 510 in the pod 110. The center opening of the air inlet peg 311 is valveless; that is, the compressed air can flow through the air inlet peg 311 as long as the side air outlet 132 of the center peg 130 aligns with the center opening. The side air outlet 132 aligns with the center opening when the disk 120 rotates the pod 110 to face the spray target. As there is only one side air outlet 132, only one pod 110 can receive the compressed air from its air inlet peg 311 at a time. When a predetermined number of copies of the pods 110 are placed horizontally in a circle on the disk 120, these pods alternately receive the compressed air from respective air inlet pegs and spray respective skin spray products from respective nozzles.

FIG. 5 also shows that the pod 110 includes a suction needle 1110, a breathing channel 1120, and an indented area 1240 under the suction needle 1110. The breathing channel 1120 is on a cross-section plane behind the illustrated cross-section plane, and is therefore illustrated with dotted lines. The breathing channel 1120 connects the inside container of the pod 110 to outside air through an air hole 610 (FIG. 6). It should be understood that various embodiments of the pod described in this disclosure may include the air hole 610; some of the drawings may omit the air hole 610 to simplify the illustration. Further details on the suction needle 1110, the breathing channel 1120, and the indented area 1240 will be provided later with reference to FIG. 11 and FIG. 12.

The air inlet peg 311 is inserted into a corresponding top peg hole 320 of the disk 120. The compressed air then flows in a horizontal path along the air passage 510 and exits from the nozzle 210. The dashed line in FIG. 6 shows the alignment of the side air outlet 132, the top peg hole 320 of the disk 120, the air inlet peg 311, and the nozzle 210.

Figure 7A:
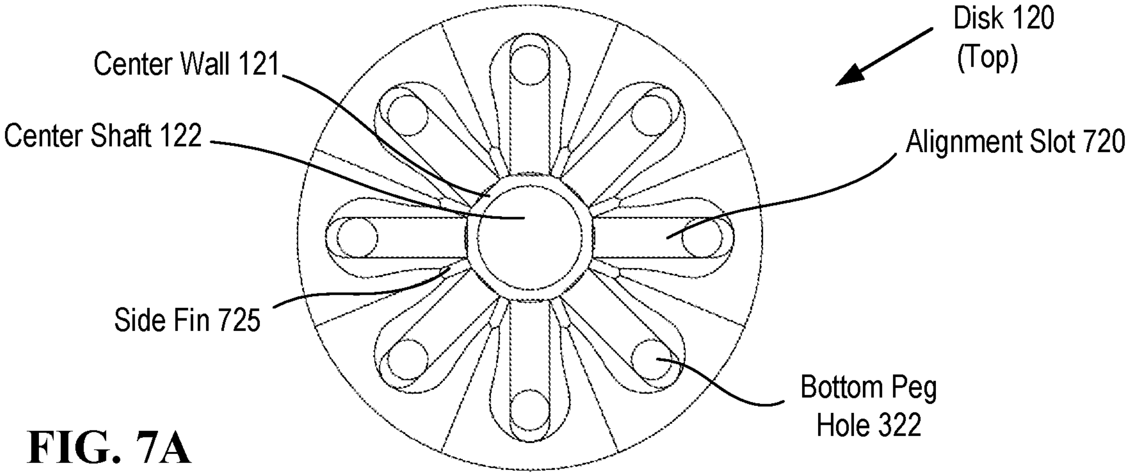
FIG. 7A, FIG. 7B, and FIG. 7C illustrate a top view, a top angle view, and a bottom view of a disk, respectively, according to one embodiment.
Figure 7B:
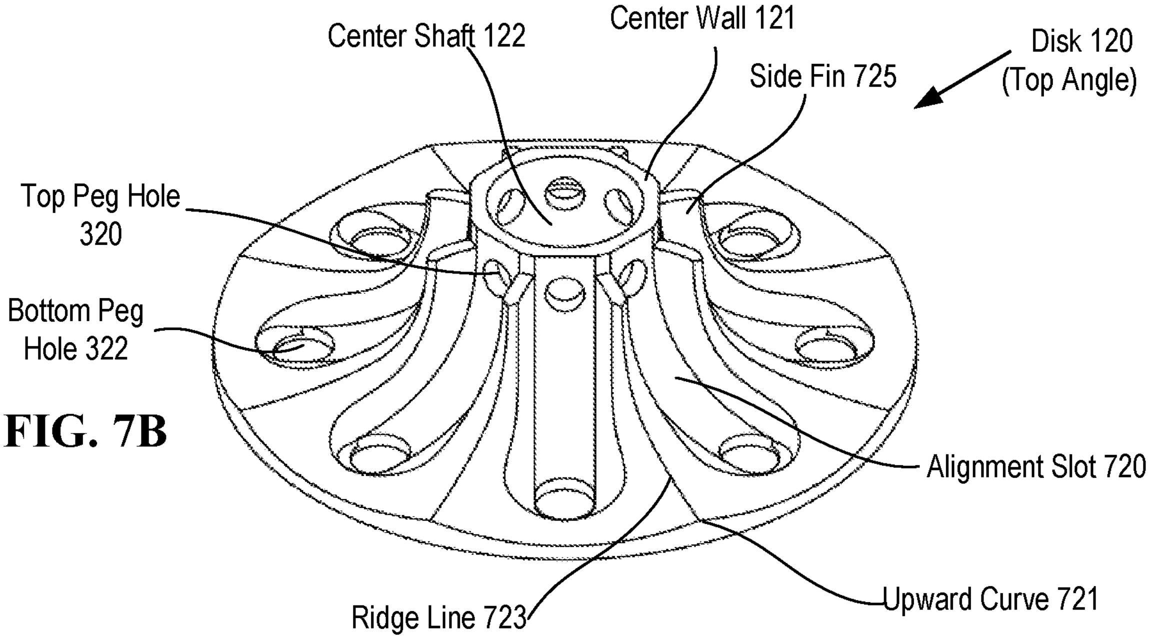
Figure 7C:
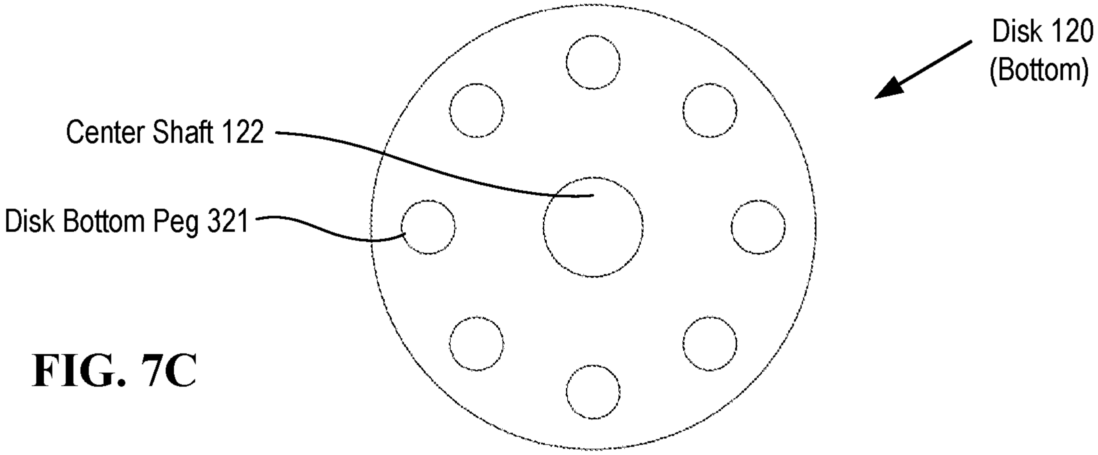

FIG. 7A, FIG. 7B, and FIG. 7C illustrate a top view, a top angle view, and a bottom view of the disk 120, respectively, according to one embodiment. FIG. 7A and FIG. 7B show the alignment slots 720 for holding the pods 110, the side fin 725 between adjacent alignment slots 720, the top peg hole 320 and the bottom peg hole 322 in each alignment slot 720. The center opening of the disk 120 is the center shaft 122 that is surrounded by the center wall 121. FIG. 7C shows the bottom of the disk 120 with disk bottom pegs 321 on the bottom surface around the center shaft 122. Each disk bottom peg 321 is formed at the bottom side of a corresponding bottom peg hole 322.

The disk 120 provides a platform to support a predetermined number (e.g., N) of pods 110. In this example, N=8. Referring also to FIG. 3 and FIG. 4, each pod 110 can be placed in a corresponding alignment slot 720 with the air inlet peg 311 of the pod 110 facing the center wall 121 and plugged into a corresponding top peg hole 320 in the center wall 121. The pod's bottom peg 311 can be plugged into a corresponding bottom peg hole 322 of the disk 120. Each pod 110 is individually insertable into the disk 120 and individually removable from the disk 120. As shown in FIGS. 7A, 7B, and 7C, the disk 120 includes eight copies of the following elements around the center wall 121.

(1) The top peg hole 320. The top peg hole 320 aligns with the center peg's side air outlet 132. A pod's air inlet peg 311 is to be inserted into the top peg hole 320.

(2) The alignment slot 720. The alignment slot 720 is shaped to serve as a guide rail for the pods 110. The alignment slot 720 curves inwards and slopes downwards from the center wall 121 to an outer edge of the disk 120 to align with the pod's curvature, achieving an optimal fit with no movement possible in any axis during spray operation. The curved shape helps guide the user to slide the pod 110 into a alignment slot 720 and to insert the pod 110 firmly in place.

(3) The bottom peg hole 322. The bottom peg hole 322 is positioned on the top surface of the disk 120 to receive the bottom peg 313 (FIG. 4) of the pod 110. The bottom peg hole 322 may be sealed; alternatively, the bottom peg hole 322 may have an opening containing a light source (e.g., a light emitting diode (LED)) that projects light upwards to illuminate the pod 110.

(4) The side fin 725. The side fins 725 at both sides of an alignment slot 720 center the left-right alignment of the pod 110 during insertion and re-enforces the lateral torque. When the pods 110 are inserted into the alignment slots 720, each pod is separated from the adjacent pods by two of the side fins 725 on both sides. Each side fin 725 has a ridge line 723 at the center where two curved sides meet. The two curved sides slope downwards to the two adjacent alignment slots 720. The curvature of the side fins 725 provides space for a user's fingers to easily remove the pods 110 from the disk 120.

(5) The upward curve 721. The ridge line 723 extends to the outer edge of the disk 120 to form an upward curve 721 at the outer edge. The upward curved shape provides more contact area for a user's fingers, which makes it easier to remove the disk 120 from the disk base 140.

(6) The disk bottom peg 321. The bottom side of the disk 120 contains circular mechanical alignment pegs, i.e., disk bottom pegs 321. The rounded shape helps the disk 120 to slip into place on the disk base 140, no matter what the alignment position is when inserted. The receiving peg holes of the disk bottom pegs 321, i.e., the disk base peg holes 342 (FIG. 3), are on the disk base 140.

The disk 120 may be made of metal or plastic. When in use, the disk 120 is placed on top of the disk base 140, and is removable from the disk base 140 after use. The disk 120 is a reusable component while the pods 110 are disposable; that is, the same disk 120 can be used repeatedly to carry new pods, replacement pods, and/or different pods. The skin spray product in the pod's container is non-refillable. In one embodiment, the pod 110 may be a single-use pod. In this embodiment, the disk 120 has eight alignment slots 720. When all eight pods 110 are inserted into the respective alignment slots 720, the pods 110 form a flower pattern from the top view as shown in FIG. 2A.

FIG. 8A, FIG. 8B, FIG. 8C, and 8D illustrate a top view, a front view, a bottom view, and a bottom angle view of the disk base assembly 20, respectively, according to one embodiment. The disk base assembly 20 is a part of a spray device or a makeup machine. In one embodiment, the disk base assembly 20 is a component of a disk head unit 900 (FIG. 9) in a makeup machine, and is not to be removed by a user.

Referring also to FIG. 1, the disk base assembly 20 includes the disk base 140, the center peg 130, and the rotation gear 150. The disk base 140 includes auto alignment circular indentations (i.e., disk base peg hole 342) aligning to the disk bottom peg 321 of the disk 120. The center peg 130 provides an air passage for delivering compressed air to the pods 110. The bottom view (FIG. 8C) of the disk base 140 shows the rotation gear 150. The bottom angle view (FIG. 8D) shows the air supply tube 131 for supplying compressed air through the center peg 130 to the pods 110.

Figure 9:
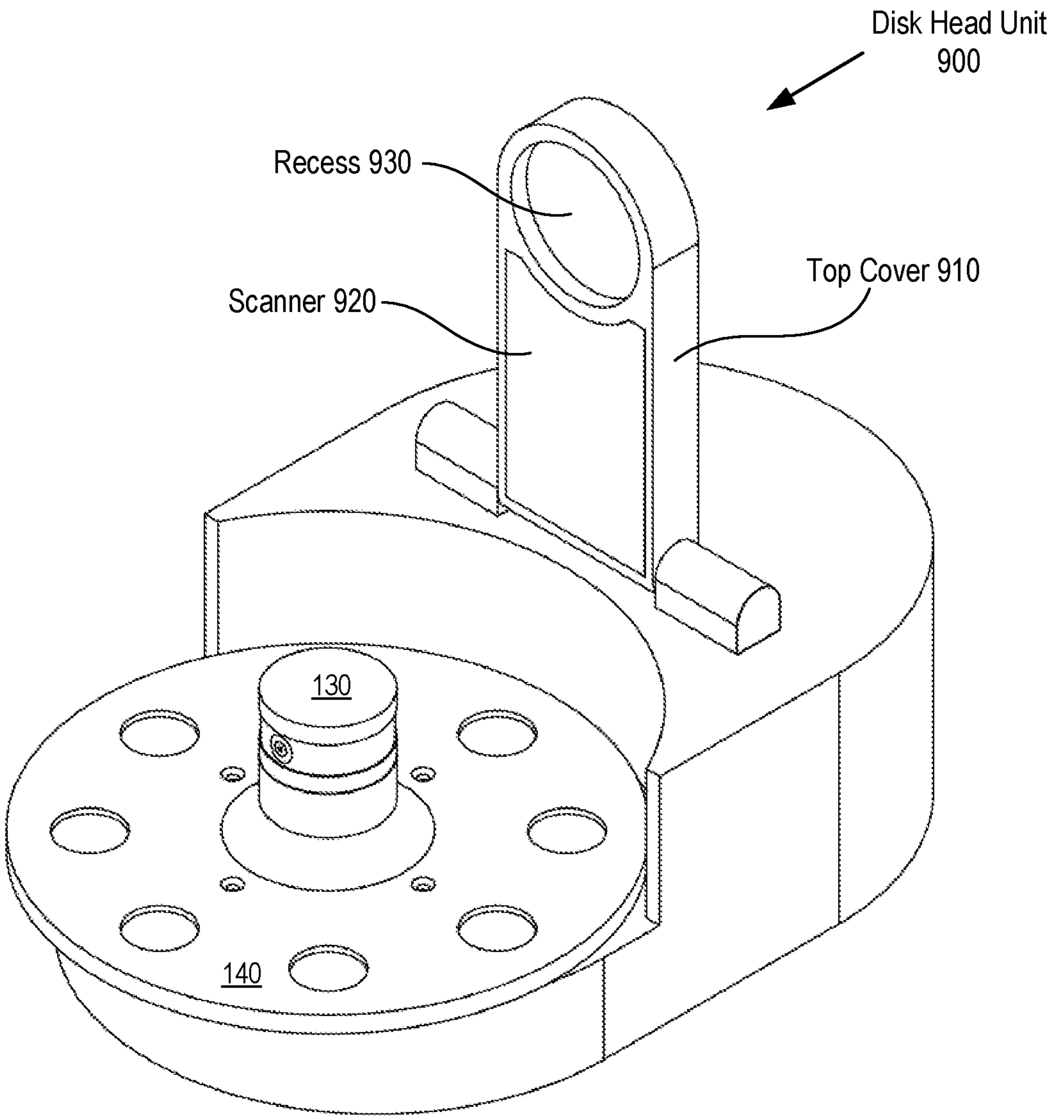
FIG. 9 illustrates a disk head unit including a disk base assembly according to one embodiment.
Figure 10B:
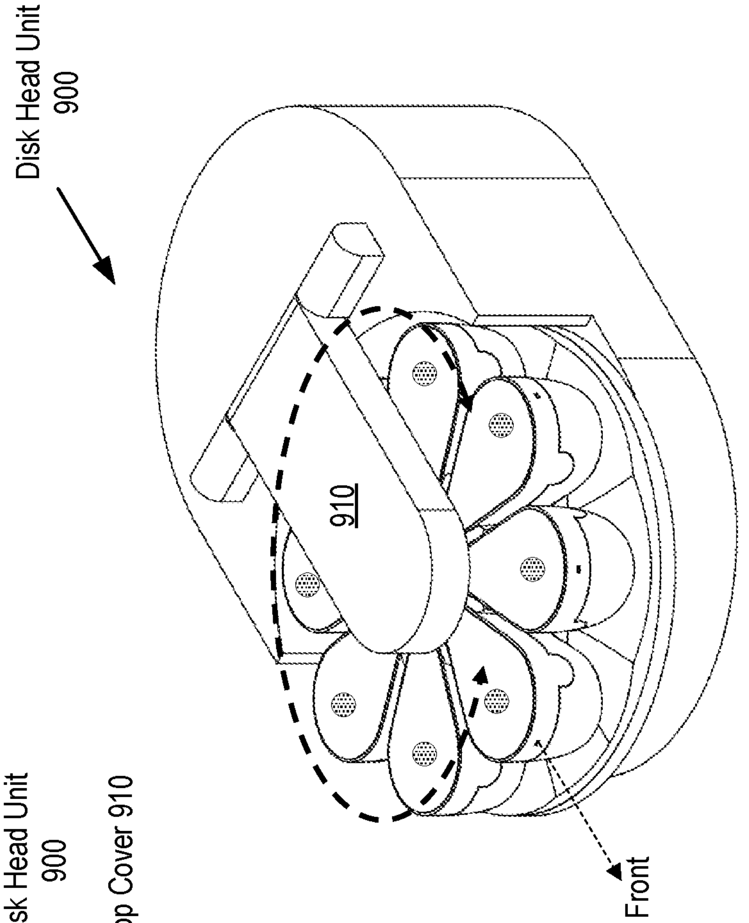
FIG. 10A and FIG. 10B illustrate a pod assembly placed in an opened disk head unit and a closed disk head unit, respectively, according to one embodiment.

FIG. 9 illustrates a disk head unit 900 according to one embodiment. The disk head unit 900 includes the disk base assembly 20 (FIG. 1); only the disk base 140 and the center peg 130 of the disk base assembly 20 are shown in this top angle view. The disk head unit 900 includes a top cover 910 embedded with a scanner; e.g., a radio frequency identification (RFID) reader 920. A round recess 930 on the top cover 910 aligns with the center peg 130 when the top cover 910 is lowered to close the disk head unit 900, as shown in FIG. 10B. In one embodiment, the disk head unit 900 may be part of a spray device such as an automatic makeup machine.

Figure 10A:
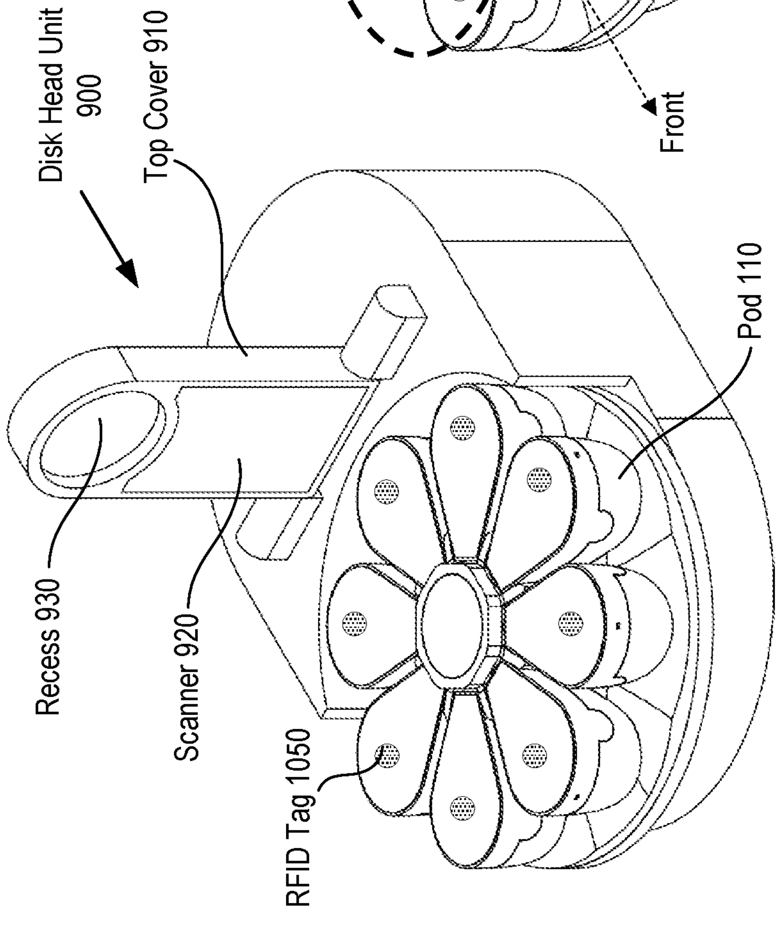

FIG. 10A and FIG. 10B illustrate a pod assembly placed in the disk head unit 900 according to one embodiment. Referring also to FIG. 1, the pod assembly 10 includes multiple pods on a disk 120. In FIG. 10A, the disk head unit 900 is opened by lifting up the top cover 910 to allow placement of the pod assembly 10. In FIG. 10B, the disk head unit is closed by lowering the cover top 910. In this embodiment, the flat top surface of each pod 110 includes a machine-readable identifier tag; e.g., an RFID tag 1050. The RFID tag 1050 provides identifying information of the skin spray product in the pod 110; e.g., color, texture, makeup type, authentication information, expiration date, brand, vendor, etc. The disk head unit 900 can read the RFID tag 1050 and send the tag data to a processor, which runs a software to verify the information of the individual pod 110 before spraying. The processor may be part of a spray device such as an automatic makeup machine. In one embodiment, the spraying operation may be disabled if the RFID tag 1050 cannot be authenticated. It is understood that a different type of identifier tag (e.g., a barcode or a QR code) and a corresponding reader or scanner may be used in alternative embodiments.

In one embodiment, the RFID reader 920 on the top cover 910 reads the RFID tags 1050 on the pods 110, one pod at a time. For example, the RFID reader 920 reads the rear-facing pod, and when the disk 120 rotates, it reads the next rear-facing pod. By using the RFID tags 1050 on the pods 110 and the RFID reader 920 on the top cover 910, the software running on the processor (to which the disk head unit 900 is connected) analyzes the order of the pods 110 that corresponds to a sequence of processes selected by the software, without the user needing to manually place the pods 110 in an exact sequence on the disk 120. The software tracks the position and the order of the pods 110. When a given pod is needed for a makeup process selected by the user, the software instructs the makeup machine to rotate the disk 120 such that the given pod faces the front (i.e., the spray target).

In one embodiment, the pod 110 includes a cover piece and a container piece attached together with a joint; e.g., a ball-and-socket joint. The two pieces joining together forms a complete pod 110. The materials of the two pieces can be different and can be manufactured separately. In one embodiment, the container piece is made up of a transparent material (e.g., polycarbonate (PC) or polypropylene (PP)) to show the liquid inside. The pod 110 is a disposable product. After the liquid in the pod 110 is used up, expires, or becomes unusable, the user can remove the pod 110 from the disk 120 and discard it.

Figure 11A:
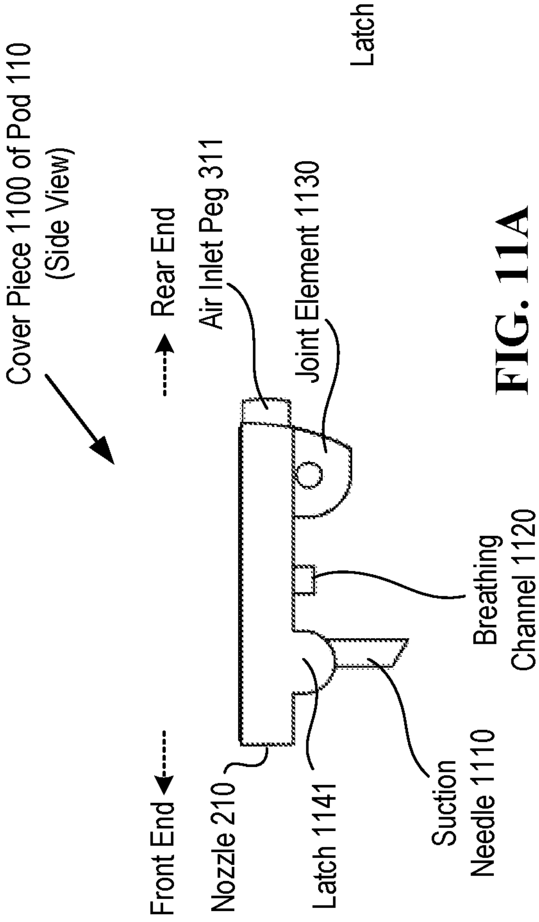
FIG. 11A and FIG. 11B illustrate a side view and a front view, respectively, of a cover piece of a pod according to one embodiment.
Figure 11B:
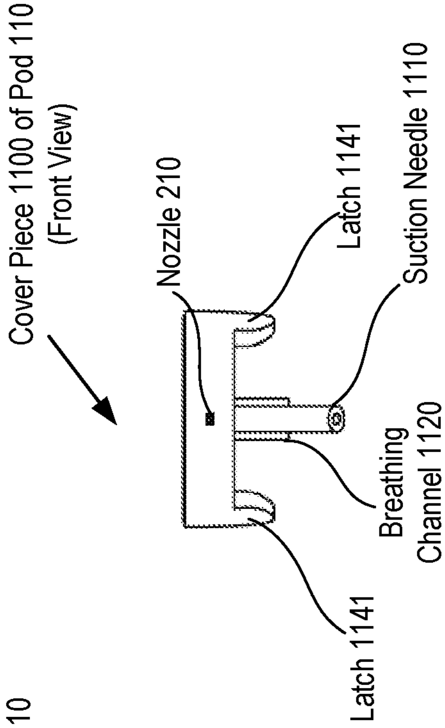
Figure 12A:
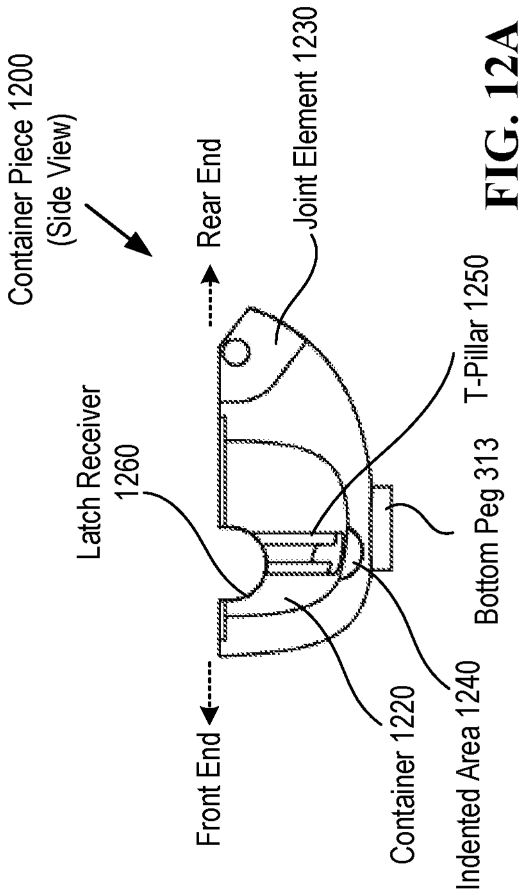
FIG. 12A and FIG. 12B illustrate a side view and a top view, respectively, of a container piece of a pod according to one embodiment.
Figure 12B:
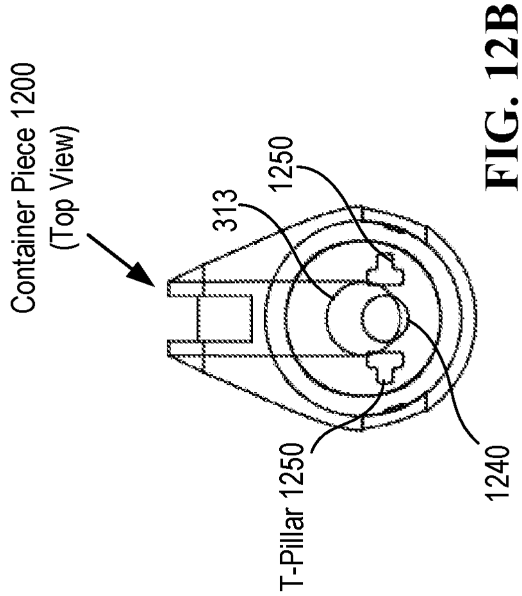

FIG. 11A and FIG. 11B illustrate a side view and a front view, respectively, of a pod's cover piece 1100 according to one embodiment. FIG. 12A and FIG. 12B illustrate a side view and a top view, respectively, of a pod's container piece 1200 according to one embodiment. The cover piece 1100 has a curved front edge with the nozzle 210 positioned at the peak of the curved front edge. The container piece 1200 has a curved bottom. The curvatures of the cover piece 1100 and the container piece 1200, as well as the curvatures of the alignment slots 720 and side fins 725 (FIGS. 7A-7C), provides space between the pod 110 and the disk 120 for a user's fingers to hold on to the pod 110 and to maneuver the insertion and removal of the pod 110 from the disk 120.

In one embodiment, the container piece 1200 is transparent. That is, the outer shell and the interior structure of the container piece 1200 are all made of a transparent material. The transparency allows a user to see the liquid in a container 1220 of the container piece 1200. To illustrate the transparency of the container piece 1200, FIG. 12A and FIG. 12B show the edge lines of the interior structure of the container piece 1200.

The cover piece 1100 includes a latch mechanism, which is easy to close but cannot be opened easily by a user. The latch mechanism may include one or more latches 1141 arranged on the sides of the pod 110; e.g., one on the right side and another on the left side. In alternative embodiments, the latch(s) may be at one or more locations on the outer edges of the cover piece 1100 different from what is shown in the example. The latches 1141 are used by a user to close the pod 110 by pressing the cover piece 1100 and the container piece 1200 together. Once the pod 110 is closed, a user may not open it without breaking the latches 1141 or the pod 110. The pod 110 is in a ready-to-use state when it is closed.

Figure 13A:
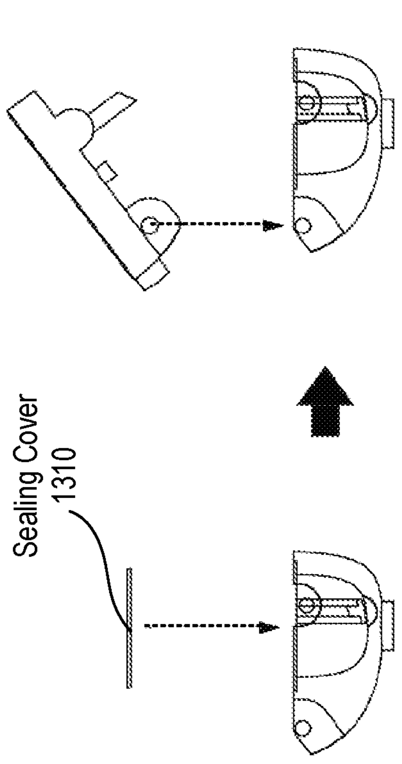
FIG. 13A illustrates steps for assembling a pod according to one embodiment.

In one embodiment, the cover piece 1100 includes a suction needle 1110 having a hollow center connecting to the air passage between the air inlet peg 311 and the nozzle 210. The suction needle 1110 extends perpendicularly from the bottom of the cover piece 1100. The suction needle 1110 is used to suck the liquid in the container piece 1200 upward into the air passage in the cover piece 1100. The suction force is created by the pull of the compressed air flowing through the air passage in the cover piece 1100, which is known as siphon with compressed air. As shown in FIG. 13A, the suction needle 1110 is also used to pierce a sealing cover 1310 of the container piece 1200 when the user closes the pod 110. The sealing cover 1310 may be an aluminum cover or a thin film of another material that can seal the liquid in the container of the container piece 1200 to prevent oxidation and drying of the liquid. The sealing cover 1310 can be pierced or punctured easily by the suction needle 1110.

Figure 13B:
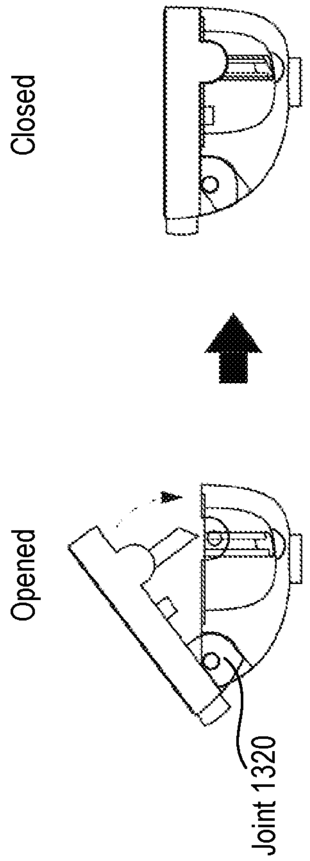
FIG. 13B illustrates steps for closing a pod according to one embodiment.

The cover piece 1100 further includes a joint element 1130 corresponding to a joint element 1230 on the container piece 1200 to form a joint, e.g., a ball-and-socket joint. The ball-and-socket joint connects the cover piece 1100 and container piece 1200 together at respective rear ends and enables the front end of the cover piece 1100 to rotate downward to latch to the container piece 1200 and close the pod 110 (FIG. 13B). The cover piece 1100 also includes the air inlet peg 311 with a center opening to receive compressed air, a breathing channel 1120 connecting the outside air to the bottom of the cover piece 1100 to regulate the air pressure in the container 1220, and a nozzle 210 to spray the skin spray product that is siphoned out from the container 1220. In one embodiment, the cover piece 1100 has a flat top surface for a label containing an ID tag such as the RFID tag 1050 (FIG. 10A and FIG. 10B).

The container piece 1200 includes the container 1220 that contains a skin spray product such as a liquid. The bottom of the container 1220 includes an indented area 1240 positioned underneath the suction needle 1110 when the pod 110 is closed. The skin spray liquid pools in the indented area 1240 underneath the suction needle 1110 when the pod 110 is closed, making it easier for the suction needle 1110 to suck up the skin spray liquid. The suction needle 1110 and/or the breathing channel 1120 may have a sharp end for piercing the sealing cover 1310 (FIG. 13A).

In one embodiment, the bottom of the container 1220 further includes two T-pillars 1250 that serve as an inner support. Each T-pillar 1250 has a T-shaped cross section and stands vertically on the bottom of the container 1220. In alternative embodiments, pillars having a different shape may be used. The T-pillars 1250 longitudinally extends from the bottom of the container 1220 to a height substantially the same as the height of the container 1220. Thus, the T-pillars 1250 can help support the sealing cover 1310 (FIG. 13A) before the pod 110 is closed. The T-pillars 1250 are positioned at two opposite sides of the suction needle 1110 when the pod 110 is closed. When a user closes the pod 110, the T-pillars 1250 can guide the suction needle 1110 on both sides to pierce the sealing cover 1310 with precision. Thus, the suction needle 1110 does not have to be very sharp to pierce the cover material such as aluminum.

The container piece 1200 also includes the joint element 1230 corresponding to the joint element 1130 of the cover piece 1100 to form a ball-and-socket joint. Referring also to FIG. 7A, the container piece 1200 has a shaped curve that aligns with the shaped curve of the alignment slot 720 on the disk 120. The container piece 1200 has an alignment peg (i.e., the bottom peg 313) on the bottom surface that fits into the disk's bottom peg hole 322. The container piece 1200 further includes one or more latch receivers 1260 corresponding to the one or more latches 1141 on the cover piece 1100 to seal shut the cover piece 1100 once the pod 110 is closed.

Figure 12C:
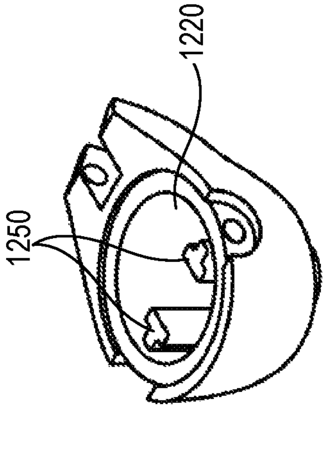
FIG. 12C and FIG. 12D illustrate a top angle view and a top view, respectively, of a container piece of a pod according to another embodiment.
Figure 12D:
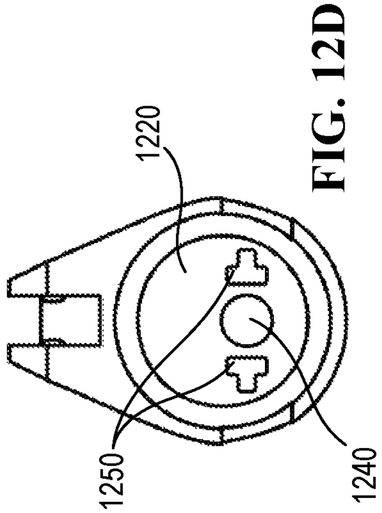
Figure 12E:
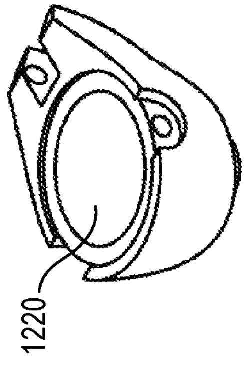
FIG. 12E and FIG. 12F illustrate a top angle view and a top view, respectively, of a container piece of a pod according to yet another embodiment.
Figure 12F:
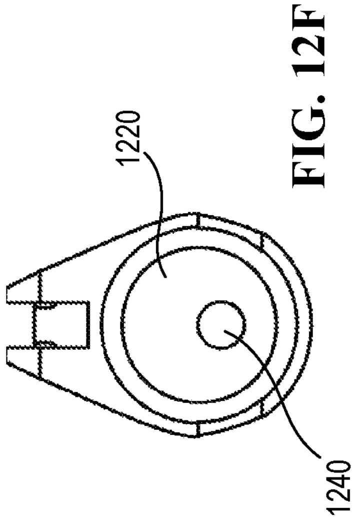

FIG. 12C and FIG. 12D illustrates a top angle view and a top view of the container piece 1200, respectively, without the transparency to more clearly show the T-pillars 1250 and the indented area 1240. FIG. 12E and FIG. 12F illustrates a top angle view and a top view of a container piece 1201, respectively, according to an alternative embodiment. The container piece 1201 is the same as the container 1200 except that the container piece 1201 does not have the T-pillars 1250. The container piece 1201 may be transparent. A corresponding cover piece for the container piece 1201 may include a suction needle with a sharp end that can easily pierce the sealing cover 1310 (FIG. 13A).

FIG. 13A illustrates steps for assembling the pod 110 according to one embodiment. FIG. 13B illustrates steps for closing a pod by a user according to one embodiment. Referring also to FIGS. 11A, 11B, 12A, and 12B, the assembling steps, which may be performed by a manufacturer of the pod 110, include filling the container 1220 with a skin spray liquid, sealing the top of the container 1220 with the cover 1310, and connecting the cover piece 1100 to the container piece 1200 with a joint 1320 that is formed at the rear end by the respective joint elements 1130 and 1230. The joint 1320 connects the cover piece 1100 to the container piece 1200 and enables a downward motion of the cover piece 1100 for closing the pod 1100. The joint elements 1130 and 1230 are shaped such that the cover piece 1100 rests on the joint 1320 at an oblique angle piece without piercing the cover 1310 as shown in FIG. 13B. More specifically, the cover piece 1100 in an opened state is supported by the joint 1320 and is cantilevered at an oblique angle over the container piece 1200. To get the pod 110 ready for use, a user may push down the front end (i.e., the nozzle end) of the pod 110 to pierce the cover 1310 and close the pod 110. In the closed state, the cover piece 1100 is horizontally aligned with and latched to the container piece 1200 from the top, with the suction needle 1110 piercing the cover 1310 to extend downward into the container 1220.

Figure 14A:
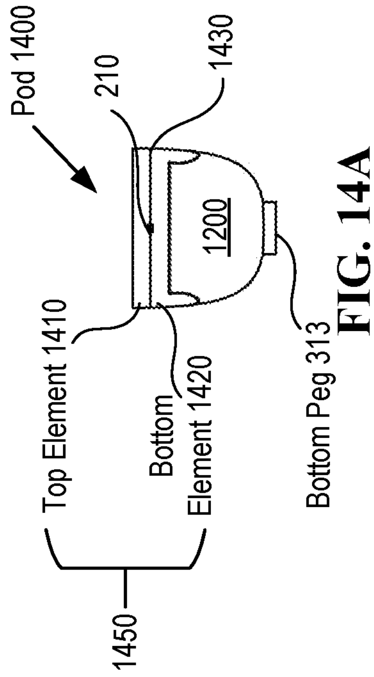
FIG. 14A and FIG. 14B illustrate a front view and a side view, respectively, of a pod according to an alternative embodiment.
Figure 14B:
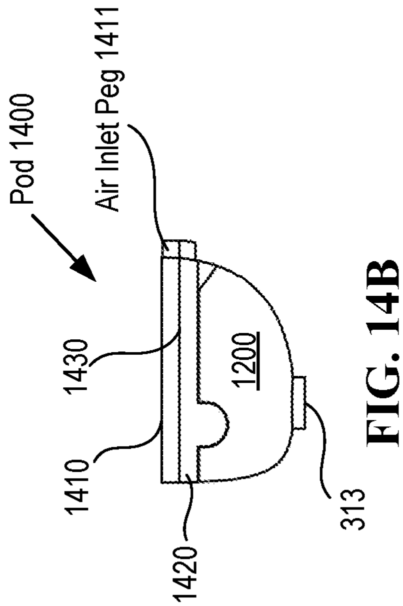
Figure 15:
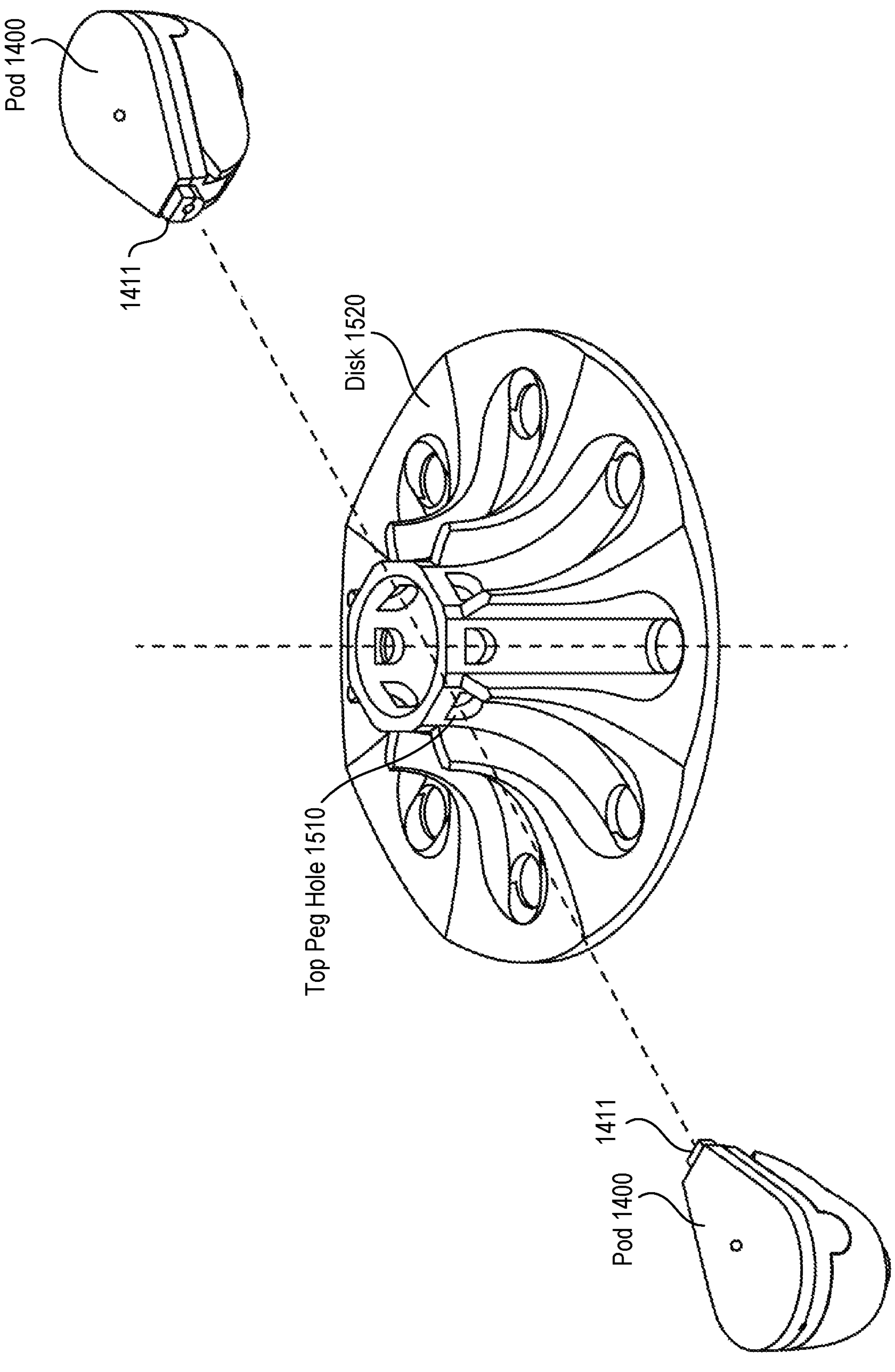
FIG. 15 illustrates the alignment of the pod of FIG. 14A and FIG. 14B with a disk according to an alternative embodiment.

FIG. 14A and FIG. 14B illustrate a front view and a side view, respectively, of a pod 1400 according to an alternative embodiment. The pod 1400 is the same as the pod 110, except that the pod 1400 has an air inlet peg 1411 with a flat top edge. Referring to FIG. 15, the pod 1400 is to be placed on a disk 1520, which is the same as the disk 120 except that each top peg hole 1510 on the disk 1520 has a flat top edge that matches the shape of the air inlet peg 1411. The pod 1400 also includes a cover piece 1450 and the container piece 1200. The cover piece 1450 is formed by a top element 1410 and a bottom element 1420, which are joined together on a horizontal plane 1430 aligned with the air passage 510 (FIG. 5). The top edge of the air inlet peg 1411 and the top surface of the cover piece 1450 are parallel with the horizontal plane 1430. The horizontal orientation and alignment simplify the manufacturing process of the cover piece 1450.

Embodiments of a pod assembly and machine components for using the pod assembly have been described. In one embodiment, a pod is provided for spraying a skin spray product on a user's skin. The pod includes a container piece which further includes a container to store the skin spray product. The container piece has a curved bottom and a bottom peg that protrudes downwards from the curved bottom to attach the pod to a disk. The pod also includes a cover piece that securely covers the container piece when the pod is in a closed state. The cover piece further includes an air inlet peg that protrudes sideways from a rear end of the cover piece to attach the pod to the disk. The air inlet peg has a valveless center opening to receive compressed air. The cover piece further includes a nozzle at a front end of the cover piece, an air passage that extends from the air inlet peg to the nozzle in a horizontal path, and a suction needle having a hollow center connecting the air passage to the container when the pod is in the closed state. A predetermined number of copies of the pod, when placed horizontally in a circle on the disk, alternately receive the compressed air from respective air inlet pegs and spray respective skin spray products from respective nozzles.

In one embodiment, one or more latches are disposed at an outer edge of the pod to latch the cover piece to the container piece. In one embodiment, the cover piece includes a top element and a bottom element that are joined together on a horizontal plane aligned with the air passage, and wherein a flat top edge of the air inlet peg and a top surface of the cover piece are parallel with horizontal plane. The pod further includes a joint to connect the cover piece to the container piece at respective rear ends. The joint enables the front end of the cover piece to rotate downward to latch to the container piece and close the pod. In one embodiment, when the pod is in an opened state, the container is sealed by a sealing cover, and the cover piece is supported by the joint and cantilevered at an oblique angle over the container piece. When the pod changes from an opened state to the closed state, the suction needle pierces a sealing cover on the container to extend downward into the container.

In one embodiment, the cover piece includes a top surface with a machine-readable identifier that provides identifying information of the skin spray product. In one embodiment, the container piece includes an indented area in the container, the indented area positioned underneath the suction needle when the pod is closed. In one embodiment, the container piece includes a pair of pillars disposed in the container and longitudinally extending from the bottom of the container. The pair of pillars may be positioned at opposite sides of the suction needle when the pod is closed.

In one embodiment, the cover piece has a curved front edge and the nozzle is positioned at a peak of the curved front edge. In one embodiment, the container piece is transparent. In one embodiment, the container is non-refillable and the pod is disposable.

In one embodiment, a pod assembly is provided for spraying skin spray products on a user's skin. The pod assembly includes multiple pods and a disk. The disk has a circular outer perimeter. The disk includes a hollow center shaft within a circular center wall, multiple alignment slots that are arranged around the circular center wall, and side fins between adjacent ones of the alignment slots. Each pod is placed in a corresponding alignment slot with the air inlet peg of the pod plugged into a corresponding top peg hole in the circular center wall of the disk. The bottom peg of the pod is plugged into a corresponding bottom peg hole of the disk. The pods on the disk alternately receive the compressed air from respective air inlet pegs and spray respective skin spray products from respective nozzles.

In one embodiment, each alignment slot includes the corresponding bottom peg hole on a top surface of the disk, and a corresponding circular peg on a bottom surface of the disk. In one embodiment, the corresponding bottom peg hole of the disk includes a light source to project light upwards.

In one embodiment, each alignment slot curves inwards and slopes downwards from the circular center wall to an outer edge of the disk to align with a curvature of each pod. Each side fin has a center ridge line where two curved sides meet. The two curved sides slope down to two adjacent alignment slots. The center ridge line extends to an outer edge of the disk to form an upward curve at the outer edge. Each pod is individually insertable into the disk and individually removable from the disk.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A pod for spraying a skin spray product on a user's skin, comprising:

a container piece including a container to store the skin spray product, the container piece having a curved bottom and a bottom peg that protrudes downwards from the curved bottom to attach the pod to a disk; and a cover piece that securely covers the container piece when the pod is in a closed state, wherein the cover piece includes:

an air inlet peg that protrudes sideways from a rear end of the cover piece to attach the pod to the disk, the air inlet peg having a valveless center opening to receive compressed air;

a nozzle at a front end of the cover piece;

an air passage that extends from the air inlet peg to the nozzle in a horizontal path; and a suction needle having a hollow center connecting the air passage to the container when the pod is in the closed state, wherein a predetermined number of copies of the pod, when placed horizontally in a circle on the disk, alternately receive the compressed air from respective air inlet pegs and spray respective skin spray products from respective nozzles.

2. The pod of claim 1, further comprising:

one or more latches disposed at an outer edge of the pod to latch the cover piece to the container piece.

3. The pod of claim 1, wherein the cover piece includes a top element and a bottom element that are joined at the air passage, and wherein a flat top edge of the air inlet peg, a top surface of the cover piece, and the air passage are oriented horizontally.

4. The pod of claim 1, further comprising:

a joint to connect the cover piece to the container piece at respective rear ends, wherein the joint enables the front end of the cover piece to rotate downward to latch to the container piece and close the pod.

5. The pod of claim 4, wherein when the pod is in an opened state, the container is sealed by a sealing cover, and the cover piece is supported by the joint and cantilevered at an oblique angle over the container piece.

6. The pod of claim 1, wherein when the pod changes from an opened state to the closed state, the suction needle pierces a sealing cover on the container to extend downward into the container.

7. The pod of claim 1, wherein the cover piece includes a top surface with a machine-readable identifier that provides identifying information of the skin spray product.

8. The pod of claim 1, wherein the container piece includes an indented area in the container, the indented area positioned underneath the suction needle when the pod is closed.

9. The pod of claim 1, wherein the container piece includes a pair of pillars disposed in the container and longitudinally extending from a bottom of the container, the pair of pillars positioned opposite sides of the suction needle when the pod is closed.

10. The pod of claim 1, wherein the cover piece has a curved front edge and the nozzle is positioned at a peak of the curved front edge.

11. The pod of claim 1, wherein the container piece is transparent.

12. The pod of claim 1, wherein the container is non-refillable and the pod is disposable.

13. A pod assembly for spraying skin spray products on a user's skin, comprising:

a plurality of pods, each pod including:

a container piece including a container to store the skin spray product, the container piece having a curved bottom and a bottom peg that protrudes downwards from the curved bottom to attach the pod to a disk;

a cover piece that securely covers the container piece when the pod is in a closed state, wherein the cover piece includes:

an air inlet peg that protrudes sideways from a rear end of the cover piece to attach the pod to the disk, the air inlet peg having a valveless center opening to receive compressed air;

a nozzle at a front end of the cover piece;

an air passage that extends from the air inlet peg to the nozzle in a horizontal path; and a suction needle having a hollow center connecting the air passage to the container when the pod is in the closed state; and a disk having a circular outer perimeter, the disk including a hollow center shaft within a circular center wall, a plurality of alignment slots arranged around the circular center wall, and side fins between adjacent ones of the alignment slots, wherein each pod is placed in a corresponding alignment slot with the air inlet peg of the pod plugged into a corresponding top peg hole in the circular center wall of the disk, and with the bottom peg plugged into a corresponding bottom peg hole of the disk, wherein the plurality of pods to alternately receive the compressed air from respective air inlet pegs and spray respective skin spray products from respective nozzles.

14. The pod assembly of claim 13, wherein each alignment slot includes the corresponding bottom peg hole on a top surface of the disk, and a corresponding circular peg on a bottom surface of the disk.

15. The pod assembly of claim 13, wherein the corresponding bottom peg hole of the disk includes a light source to project light upwards.

16. The pod assembly of claim 13, wherein each alignment slot curves inwards and slopes down from the circular center wall to an outer edge of the disk to align with a curvature of each pod.

17. The pod assembly of claim 13, wherein each side fin has a center ridge line where two curved sides meet, and wherein the two curved sides slope down to two adjacent and the center ridge line extends to an outer edge of the disk to form an upward curve at the outer edge.

18. The pod assembly of claim 13, wherein each pod is individually insertable into the disk and individually removable from the disk.

19. The pod assembly of claim 13, wherein the container is non-refillable and each pod is disposable.

20. The pod assembly of claim 13, wherein the cover piece of each pod includes a top surface with a machine-readable identifier that provides identifying information of the skin spray product in the container.

* * * * *